(12) United States Patent
Baic

(10) Patent No.: US 9,120,577 B1
(45) Date of Patent: Sep. 1, 2015

(54) PRESSURE RELIEF LATCH

(71) Applicant: Avibank Manufacturing, Inc., North Hollywood, CA (US)

(72) Inventor: Zeljko Baic, Sylmar, CA (US)

(73) Assignee: Avibank Manufacturing, Inc., North Hollywood, CA (US)

( * ) Notice: Subject to any disclaimer, the term of this patent is extended or adjusted under 35 U.S.C. 154(b) by 151 days.

(21) Appl. No.: 14/035,706

(22) Filed: Sep. 24, 2013

(51) Int. Cl.
*E05C 1/12* (2006.01)
*B64D 29/06* (2006.01)
*E05C 19/04* (2006.01)

(52) U.S. Cl.
CPC ............... *B64D 29/06* (2013.01); *E05C 19/04* (2013.01)

(58) Field of Classification Search
CPC ....... E05B 65/102; E05C 19/04; E05C 19/02; E05C 19/06; E05F 1/002; E05F 1/006
USPC ........... 292/23, 126, 100, 226, 200, DIG. 49, 292/143, 173, 93, 193, 256.69, 166, 145
See application file for complete search history.

(56) References Cited

U.S. PATENT DOCUMENTS

| 1,593,372 | A | * | 7/1926 | Thompson | 292/164 |
| 1,873,560 | A | * | 8/1932 | Ekman | 292/332 |
| 1,880,251 | A | * | 10/1932 | Hornung | 292/173 |
| 1,924,898 | A | * | 8/1933 | Anderson | 292/173 |
| 1,928,767 | A | * | 10/1933 | Schnell | 292/173 |
| 4,230,352 | A | * | 10/1980 | Sealey et al. | 292/341.17 |
| 4,335,595 | A | * | 6/1982 | Swan et al. | 70/149 |
| 4,826,221 | A | * | 5/1989 | Harmon | 292/167 |
| 5,765,883 | A | * | 6/1998 | Dessenberger et al. | 292/92 |
| 6,513,841 | B1 | * | 2/2003 | Jackson | 292/214 |
| 6,755,448 | B2 | * | 6/2004 | Jackson et al. | 292/113 |
| 8,113,551 | B2 | * | 2/2012 | Baic et al. | 292/113 |
| 8,740,147 | B2 | * | 6/2014 | Defrance et al. | 244/129.4 |
| 2011/0109103 | A1 | * | 5/2011 | Huston et al. | 292/164 |
| 2013/0140832 | A1 | * | 6/2013 | Do | 292/177 |

* cited by examiner

*Primary Examiner* — Kristina Fulton
*Assistant Examiner* — Christine M Mills
(74) *Attorney, Agent, or Firm* — R. Scott Kimsey, Esq.; Klein DeNatale Goldner

(57) ABSTRACT

A pressure relief latch includes a housing fastenable to a first panel of a structure and a rotatable handle attached to the housing. The housing includes a compression spring that biases a roller toward a second panel. A keeper assembly is attached to the second panel, the keeper assembly having a keeper extending therefrom. When the latch is in the closed position, the roller engages the keeper. When the handle is rotated upward, the roller disengages the keeper. A safety release may be provided to prevent inadvertent rotation of the handle.

13 Claims, 4 Drawing Sheets

PRESSURE RELIEF LATCH

RELATED APPLICATIONS

Not Applicable.

BACKGROUND OF THE INVENTION

1. Field of the Invention

The present invention relates generally to a latch, and more specifically to a pressure relief latch for use with an aircraft.

2. Background

Heated air, under high pressure, is generated during operation of a modern aircraft. The air is directed through various structures in the aircraft for venting or to perform a variety of functions for the aircraft. Pressure relief doors or panels are provided to allow pressure to vent when necessary, to prevent failure of metal skin panels or other structures of the aircraft. The panels also allow for easy access to internal portions of these areas, so that routine maintenance and inspection operations may be performed.

One example of an aircraft component that benefits from a pressure relief latch is the engine cowling. Aircraft engines have high internal operating pressure, and the cowling is rated to a maximum pressure. As the internal pressure approaches near to the maximum allowable pressure, it is desirable for the latch to open automatically to prevent overpressure. Although such a latch is not designed to open automatically until a given high-pressure value is reached, maintenance and inspection personnel require access to the interior of the cowling and should be able to open the latch easily when necessary.

SUMMARY OF THE INVENTION

A pressure relief latch includes a housing fastenable to a first panel of a structure secured by the latch and a pivotable handle attached to the housing. A compression spring is attached to the housing and biases a roller in a first direction, in a closed configuration.

A keeper assembly is fastenable to a second panel of the structure to be secured by the latch. The keeper assembly includes a keeper extending from the keeper assembly toward the roller.

The pressure relief latch may include a safety release attached to the handle, such that when the safety release is engaged upward rotation of the handle is prevented, and when the safety release is disengaged upward rotation of the handle is allowed, the upward rotation of the handle causing the roller to move away from the keeper and the roller to disengage the keeper. Once the roller disengages the keeper, at least one of the panels may open.

The safety release latch may include a hook and the pressure relief latch may include a locking pin.

When the latch is in a closed position, the roller engages the keeper and the hook of the safety release engages the locking pin. The handle is thereby prevented from rotating in an upward direction. When the safety release is actuated, the hooks of the safety release disengage the locking pin, and the handle is capable of being rotated in an upward direction. Rotating the handle in an upward direction causes movement of the roller such that the roller disengages the keeper sufficiently to allow the opening of the pertinent panel.

The housing may include a first end and a second end, and a first attachment plate having an upper surface and a lower surface. A plurality of openings in the first attachment plate allow for attachment of the housing to a first panel of an enclosed structure. A cutout portion in the first attachment plate extends from the upper surface to the lower surface thereof.

First and second support tabs may depend from the lower surface of the attachment plate, at a first end of the attachment plate, and define a channel therebetween. The first support tab defines a first elongate aperture therethrough, and the second support tab defines a second elongate aperture therethrough.

First and second hinge plates may depend from the lower surface of the attachment plate at a second end of the attachment plate, and may define a channel therebetween.

First and second locking plates may depend from the lower surface of the attachment plate between the support tabs and the hinge plates, and may define a channel therebetween.

A pivot pin may extend between the first hinge plate and the second hinge plate.

The locking pin may extend between the first locking plate and the second locking plate.

A roller support pin may extend from the first elongate aperture of the first support tab to the second elongate aperture of the second support tab.

The handle may be disposed within the cutout portion of the first attachment plate, and may be pivotably attached to the pivot pin and have first and second spaced-apart hinge members depending therefrom. The first and second hinge members may define a channel therebetween. The first and second hinge members may each define an elongate aperture therethrough.

A handle pin may extend between apertures of the first and second hinge members.

The safety release may be pivotably attached to the handle.

A yoke may be attached to the roller support pin. The roller may be disposed on the first side of the yoke.

A first spring plate may be attached to the second side of the yoke.

A second spring plate may be attached to the handle pin.

A spring support may be attached to the first spring plate and the second spring plate and extend therebetween.

A first spring may be disposed along the length of the spring support between the first spring plate and the second spring plate.

A second spring may be disposed along the length of the spring support between the first spring plate and the second spring plate. The second spring may have a diameter greater than the diameter of the first spring, with the second spring disposed within the first spring.

The keeper assembly may include a second attachment plate with an upper surface and a lower surface. A plurality of openings may be provided in the second attachment plate for fastening the keeper assembly to the second panel.

A keeper housing with a bore extending therethrough may extend from the lower surface of the second attachment plate.

The keeper may be disposed within the bore of the keeper housing, extending from a first side thereof toward the roller, with the keeper engaging the roller when the latch is in a closed position.

DETAILED DESCRIPTION OF THE INVENTION

In the course of the following description, various relative terms such as "up," "down," "upper," and "lower" may be used to describe aspects of the present invention. As used herein, these terms describe components of the present invention as oriented in FIG. 2, with attachment plate 88, for example, representing an "upper" portion of pressure relief latch 10. It is to be understood the these terms are used for purposes of clarity and for ease of understanding of the invention, and are not intended to suggest any particular orientation of pressure relief latch 10 when in use for its intended purpose.

Figure 1:
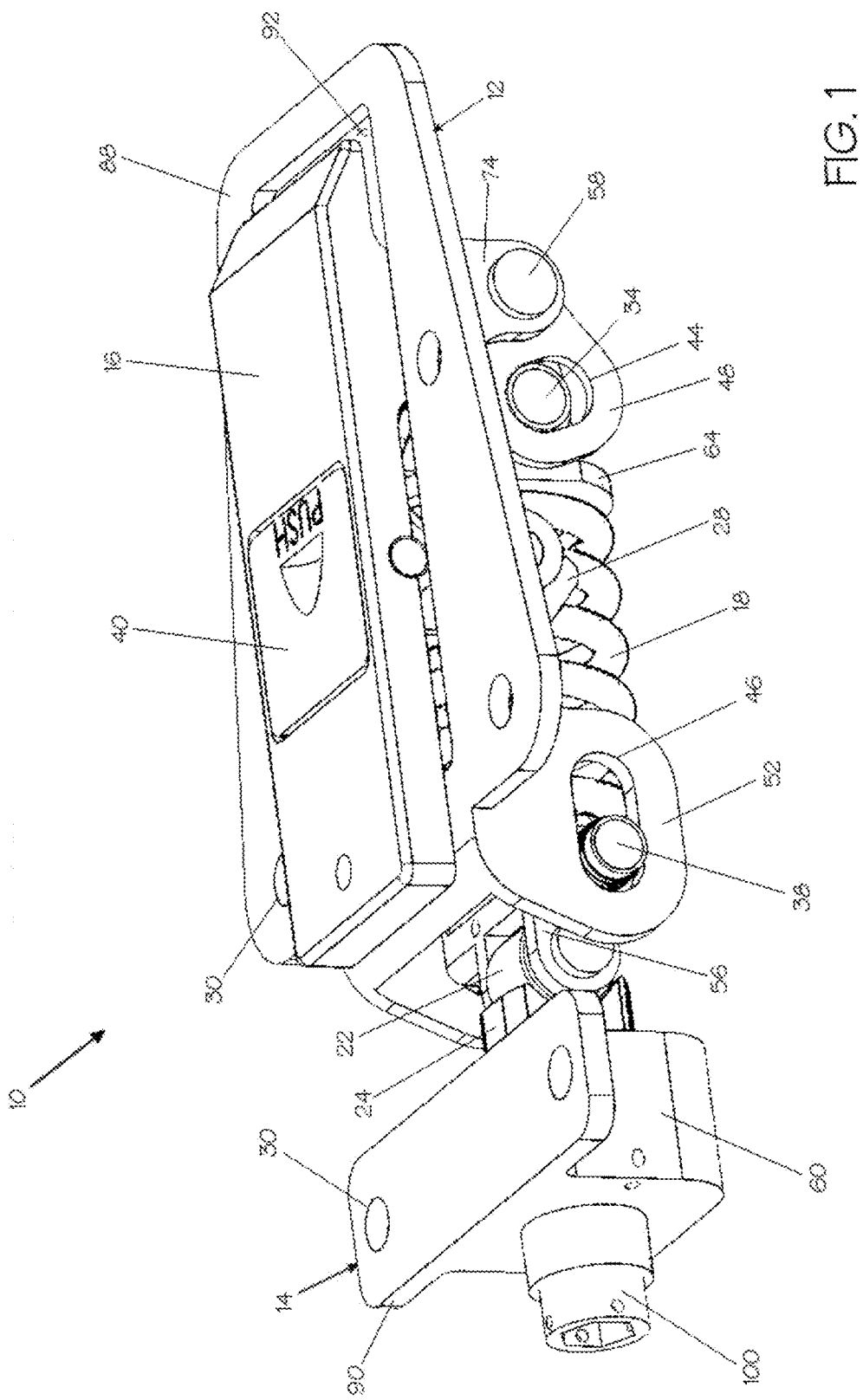
FIG. 1 is a top and side perspective view of an embodiment of a pressure relief latch shown in a closed configuration.

FIG. 1 provides a top and side perspective view of a pressure relief latch 10 having a housing 12 and a keeper assembly 14. In operation, housing 12 and keeper assembly 14 are affixed to separate doors or panels of a structure in which pressure may increase. For example, housing 12 and keeper assembly 14 may be fastened to opposing doors or panels of an aircraft engine cowling. Housing 12 and keeper assembly 14 each include an attachment plate (attachment plates 88 and 90, respectively) having a plurality of openings 30 through which fasteners may be inserted to attach housing 12 and keeper assembly 14 to the appropriate structure. Any suitable fasteners may be used to effect the attachment.

Also visible in the view shown in FIG. 1 is first compression spring 18 of housing 12. Handle 16 is associated with housing 12 and disposed within cutout portion 92. Safety release 40 of handle 16 is shown, as are roller 22, and keeper 24 extending from keeper assembly 14 toward roller 22. As shown in FIG. 1, pressure relief latch 10 is in a closed configuration.

First support tab 52 and second support tab 54 (not visible) extend downwardly from attachment plate 88, each having an elongate aperture 46 defined therein. Opposing ends of roller support pin 38 extend through apertures 46 in first support tab 52 and second support tab 54. First compression spring 18 is shown within an interior space of housing 12. Spring 18 is contained between first spring plate 62 and second spring plate 64 (with only second spring plate 64 being visible in FIG. 1). First hook 28 is visible, extending downward from safety release 40. In the closed position, as shown, first hook 28 and second hook 29 (not visible) engage locking pin 36, which extends between first locking plate 70 and second locking plate 72, as shown in FIG. 2.

First hinge member 48 of handle 16 is shown, the hinge member 48 including an elongate aperture 44 through which is inserted an end of handle pin 34. Though not visible in FIG. 1, handle 16 has a second, opposing hinge member 50 extending downward on the opposite side from first hinge member 48. Second hinge member 50 also has an elongate aperture 44 for receiving the other end of handle pin 34 thereinto. Structurally, second hinge member 50 is substantially the same as first hinge member 48. Finally, first hinge plate 74 is shown extending downward from attachment plate 88. First hinge plate 74 includes an aperture (not shown) through which an end of pivot pin 58 is received. Although not visible in the drawing, housing 12 includes a second, opposing hinge plate 76 on the opposite side thereof, having substantially the same structure.

Figure 2:
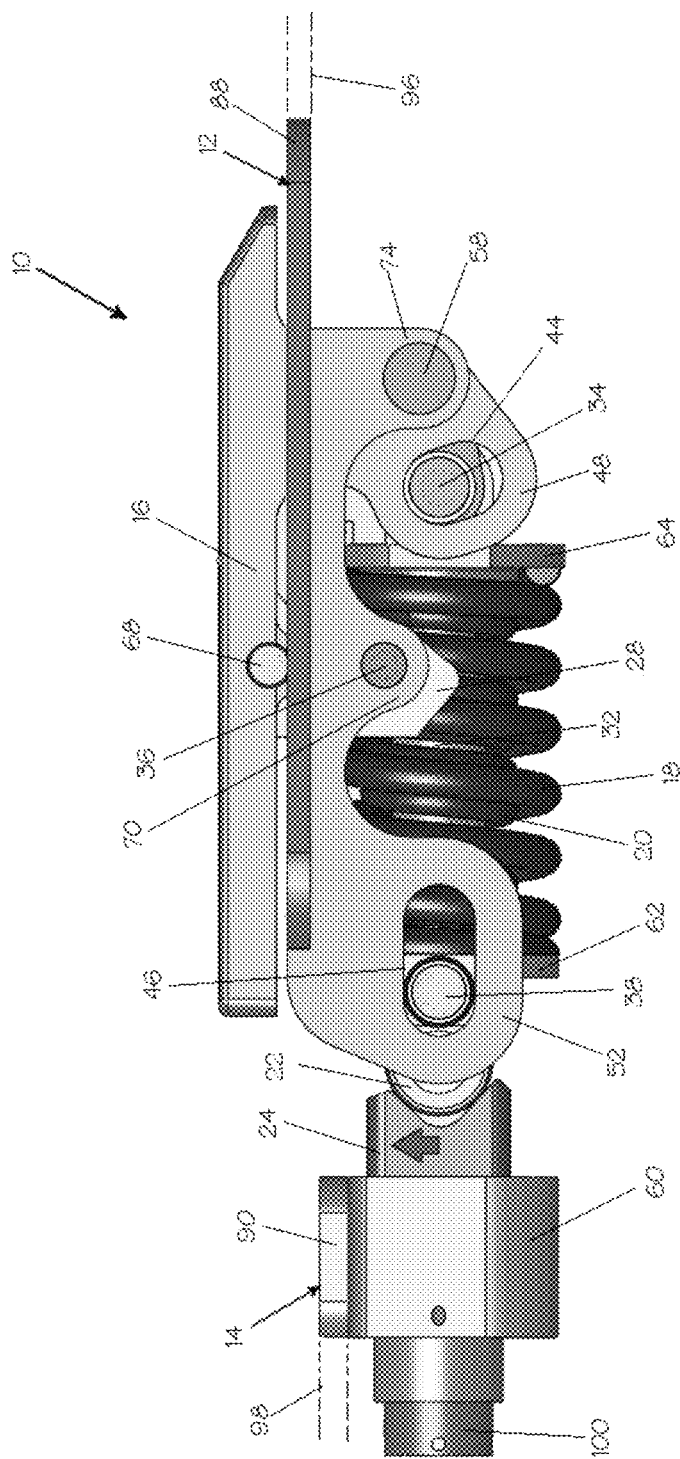
FIG. 2 is a side elevation view of the pressure relief latch of FIG. 1.

FIG. 2 provides a side view of pressure relief latch 10 of FIG. 1.

Housing 12 and keeper assembly 14 are shown side by side, in substantially the same relative positions as they would be when pressure relief latch 10 is installed in a suitable structure for its intended use. Handle 16 extends partially above and partially below first attachment plate 88. Handle 16 includes first hinge member 48 and second hinge member 50 (not shown in this view) extending downward therefrom, each including an elongate aperture 44 defined therein. Hinge plates 74 and 76 also extend downwardly from the underside of housing 12. Hinge plate 74 and hinge plate 76 each have an aperture to receive a portion of pivot pin 58, which also extends through a portion of handle 16 so that handle 16 can rotate therearound. Handle pin 34 extends between apertures 44 in the first hinge member 48 and second hinge member 50 and allows handle 16 to engage other structural components of pressure relief latch 10 upon rotational movement of handle 16.

Safety release 40 includes hooks 28 and 29 that extend downwardly through cutout portion 92 of attachment plate 88. Hooks 28 and 29 are shaped to form catches 26 for receiving opposing ends of locking pin 36. When pressure relief latch 10 is in the closed position, locking pin 36 is received within catches 26, locking pressure relief latch 10 in the closed position. Locking pin 36 extends between first locking plate 70 and second locking plate 72.

Springs 18 and 20 are disposed within housing 12 in a dual-spring arrangement, with second spring 20 disposed within the interior space of first spring 18. The springs 18 and 20 are positioned between first spring plate 62 and second spring plate 64. Yoke 78 (best shown in FIG. 3) is attached to the side of first spring plate 62 opposite springs 18 and 20. Yoke 78 is maintained in position by roller support pin 38. Yoke 78 has two extending arms that have roller pin 86 extending therebetween. Roller 22 is mounted on roller pin 86 and can rotate freely between the arms of yoke 78 when latch 10 is open and roller 22 and keeper 24 are disengaged.

Keeper assembly 14 includes second attachment plate 90, from which keeper housing 60 extends in a downward direction. Keeper housing 60 has a central opening therethrough, through which keeper 24 extends. An adjustment nut 100 extends from the other side of keeper housing 60, the adjustment nut 100 being attached to keeper 24. A user of the pressure relief latch 10 can adjust the latch's release point by turning adjustment nut 100 with a tool, thereby causing axial movement of keeper 24. Moving keeper 24 closer to roller 22 creates the release point, so that greater pressure within the enclosure is required to cause pressure relief latch 10 to open, as described in greater detail, below.

As also shown in FIG. 2, first attachment plate 88 is secured to first panel 96 of the structure with which pressure relief latch 10 is being used. Second attachment plate 90 is secured to second panel 98 of the structure.

Figure 3:
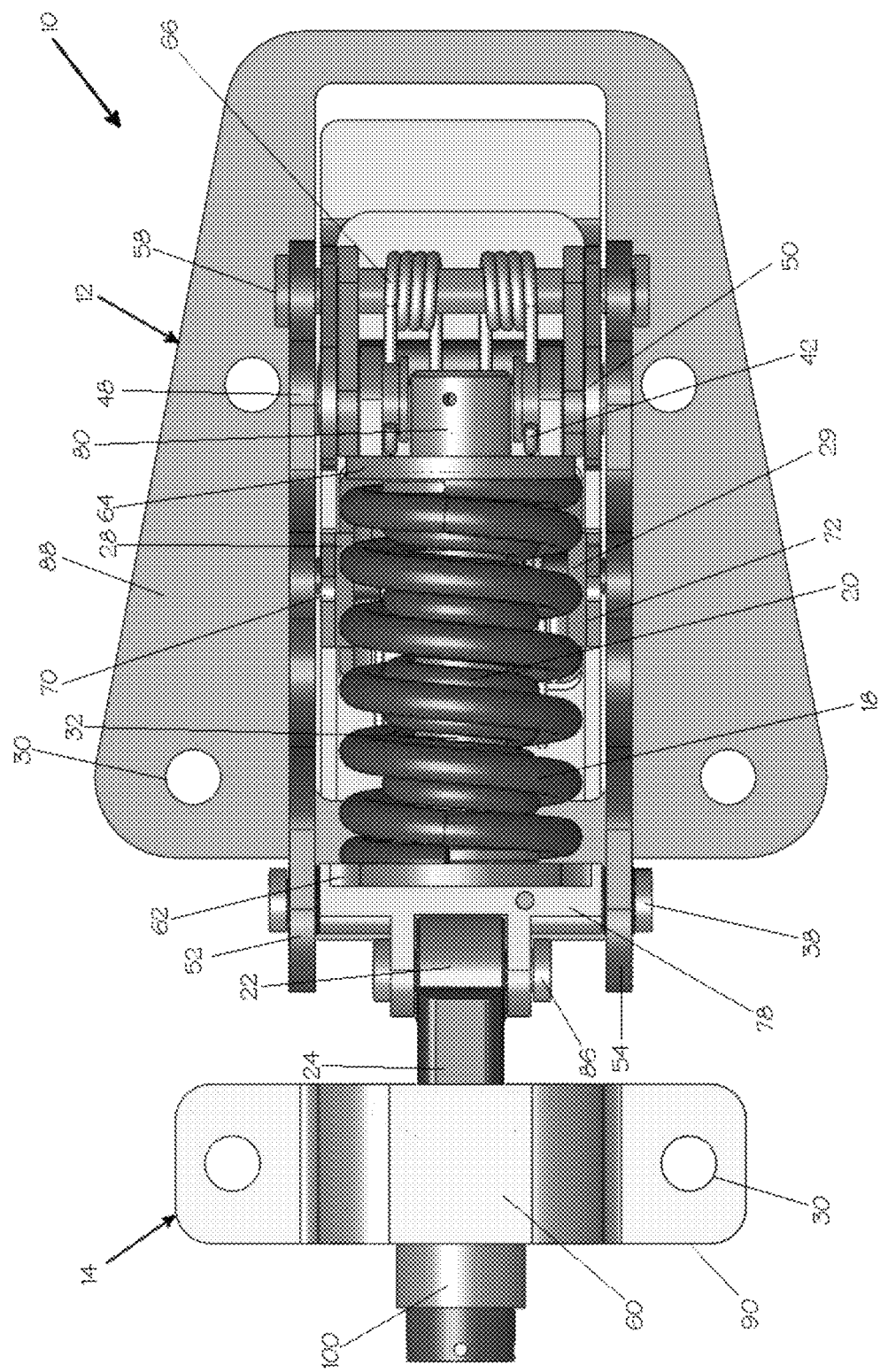
FIG. 3 is a bottom view of the pressure relief latch of FIG. 1.

FIG. 3 provides a bottom elevation view of an embodiment of pressure relief latch 10. As shown in the figure, first support tab 52 and second support tab 54 are spaced apart to form a channel between the two. Yoke 78 is disposed between the first support tab 52 and the second support tab 54, in the channel formed between the two tabs. Yoke 78 has a first end with two extending arms having roller 22 disposed therebetween as described above, and a second end having a first spring plate 62 attached thereto.

Second adjustment nut 80 is shown, affixed to second spring plate 64. Second adjustment nut 80 has second spring plate 64 attached thereto. A user of pressure relief latch 10 can rotate second adjustment nut 80 to adjust the spacing between first spring plate 62 and second spring plate 64, and thus the degree of compression of first compression spring 18 and second compression spring 20. A spring support 32 extends between first spring plate 62 and second spring plate 64.

Second spring 20 is disposed around spring support 32, which is generally cylindrical in shape and can receive second spring 20 thereover. First spring 18 is also disposed over spring support 32. First spring 18 has a greater diameter than second spring 20, and second spring 20 is received within the interior cylindrical space defined by first spring 18. Alternatively, a single compression spring may be used in some embodiments of a pressure relief latch 10.

Also shown in FIG. 3 is torsion spring 66, which is disposed on pivot pin 58. Torsion spring 66 biases against the underside of safety release 40, such that after safety release 40 has been depressed to unlock pressure relief latch 10, safety release 40 tends to be biased back toward its original position so that it is available to be depressed again when necessary. A clip 42 is also present to prevent side-to-side motion of handle pin 34.

Also visible in FIG. 3 is roller support pin 38, extending through yoke 78 from first support tab 52 to second support tab 54. Further, the undersides of first locking plate 70, second locking plate 72, first hook 28, and second hook 29 are visible. First hinge member 48 and second hinge member 50 are also shown from the bottom.

Keeper assembly 14 is shown, with attachment plate 90, keeper housing 60, keeper 24, and first adjustment nut 100 all visible from the bottom.

Figure 4:
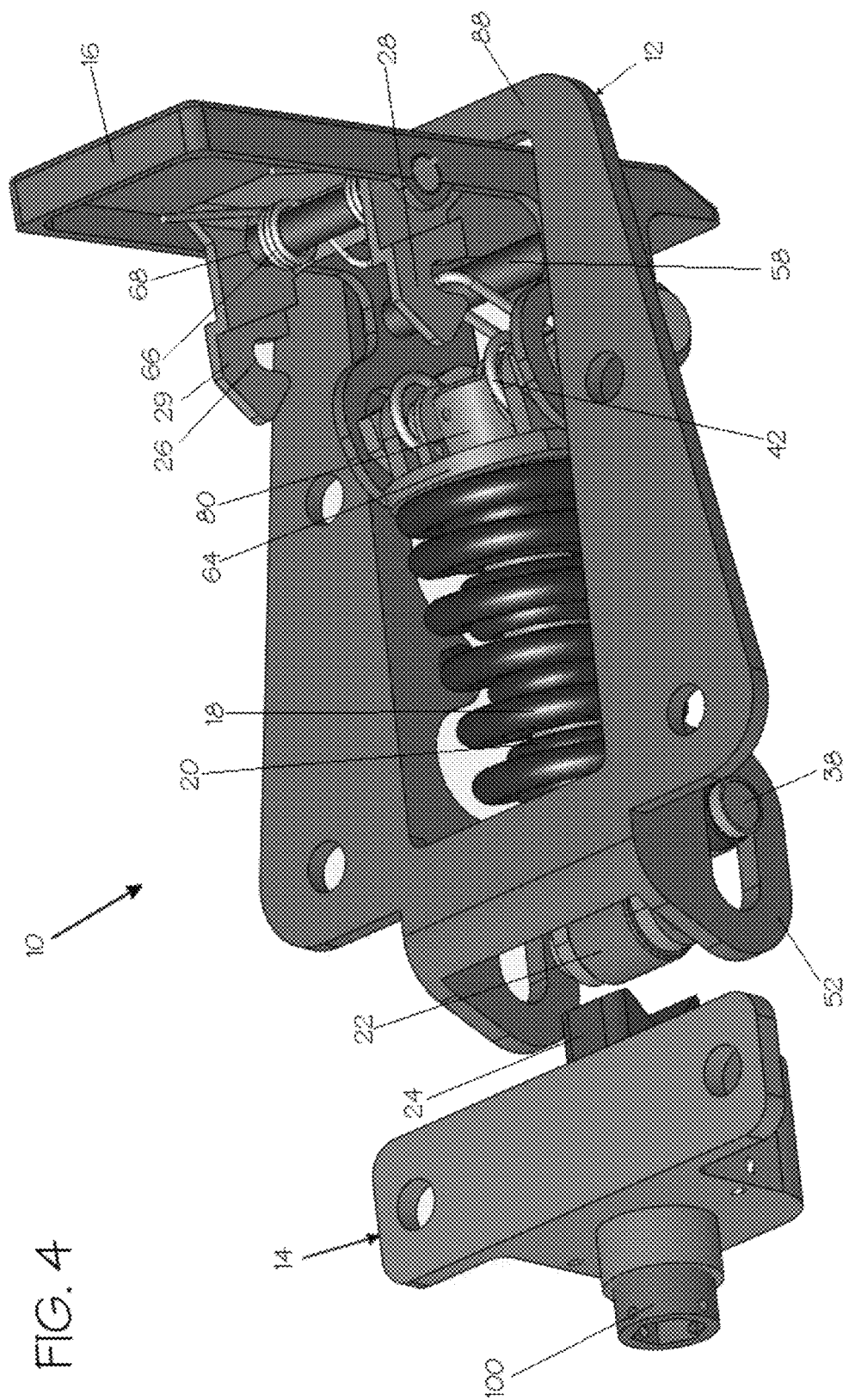
FIG. 4 is a top perspective view of the pressure relief latch of FIG. 1 shown in an open configuration.

FIG. 4 shows an embodiment of pressure relief latch 10 in the open position. As shown, handle 16 has been rotated upward and hooks 28 and 29 of safety release 40 are disengaged from locking pin 36. As can be seen, safety release 40 pivots on safety pivot pin 68, on which torsion spring 66 is likewise disposed. The components of pressure relief latch 10 shown in FIG. 4 are as described with respect to the other figures, above.

Operation of pressure relief latch 10 is now described. Housing 12 and keeper assembly 14 are fastened to adjacent panels of a structure desired to be secured with pressure relief latch 10. FIG. 2 shows exemplary placement of housing 12 and keeper assembly 14 on first panel 96 and second panel 98 of an appropriate structure. At least one of the two panels opens relative to the other, though it is contemplated that both panels may be capable of opening. When the pressure relief latch 10 is in the closed position, as shown in the drawings, keeper 24 associated with keeper assembly 14 is engaged with roller 22 associated with housing 12. Compression springs 18 and 20 bias roller 22 outward, toward keeper 24, under normal conditions, and thereby preventing the panels secured by pressure relief latch 10 from opening. Handle 16 is in the closed position, as shown, and hooks 28 and 29 of safety release 40 are engaged with locking pin 36. Handle 16 cannot be moved upward, to the unlocked position, because of the engagement of safety release 40 and locking pin 36 prevents the upward movement.

When it is necessary or desirable to manually open the panels secured by pressure relief latch 10, safety release 40 is actuated, causing hooks 28 and 29 to disengage locking pin 36. Once locking pin 36 is disengaged, handle 16 can be rotated in an upward direction, pivoting on pivot pin 58. The rotational movement of handle 16 causes roller 22 to axially retract from keeper 24, allowing one or both of the panels with which pressure relief latch 10 is associated to be opened. When it is desired to close pressure relief latch 10, handle 16 is rotated in a downward direction, causing roller 22 to engage keeper 24. Hooks 28 and 29 engage locking pin 36 to prevent inadvertent opening of pressure relief latch 10 due to unwanted upward rotation of handle 16.

Pressure relief latch 10 is designed to open automatically under predetermined pressure conditions (e.g. just prior to the maximum pressure for which the structure is rated), to allow a release of pressure prior to damage to, or failure of, panels or other portions of the structure in which pressure relief latch 10 is being used (an aircraft engine cowling, for example). The pressure level at which pressure relief latch 10 opens automatically is determined by the properties of compression springs 18 and 20. As pressure builds within the structure on which pressure relief latch 10 is being used, that pressure tends to force one or more of the panels open. The engagement between keeper 24 and roller 22 provides a competing tendency to hold the panels closed. When the pressure becomes sufficiently strong, the force pushing against, for example, the panel to which housing 12 is fastened becomes sufficiently strong that roller 22 is forced upward with respect to keeper 24, forcing roller 22 inward against the action of compression springs 18 and 20. When this occurs, pressure relief latch 10 opens, allowing pressure to be released from the interior of the structure.

Pressure relief latch 10 may be used to secure a variety of panels enclosing interior spaces subject to increases in pressure. In the situation where a single panel opens, either housing 12 or keeper assembly 14 may be installed on the panel that opens. The pressure relief latch 10 may also be used in the situation where two adjacent panels both open, and where housing 12 is installed on one panel and keeper assembly 14 is installed on the other panel.

The foregoing description and attached drawings are exemplary of a pressure relief latch, and are provided for purposes of clarity in understanding the invention. It is to be understood that various modifications to that shown and described herein will be readily apparent to one of skill in the art upon reading this disclosure. Such modifications are within the spirit and scope of the present invention.

Having thus described the preferred embodiment of the invention, what is claimed as new and desired to be protected by Letters Patent includes the following:

1. A pressure relief latch for use with first and second panels of a structure to be secured by the latch, the pressure relief latch comprising:
   a housing fastenable to the first panel, the housing comprising a first end, a second end, an upper surface, a lower surface, a first side depending from the lower surface, and a second opposing side depending from the lower surface, the first and second sides defining a channel therebetween;
   a handle pivotably attached to the housing;
   a roller support pin extending from the first side of the housing to the second side of the housing at the first end of the housing;
   a handle pin extending longitudinally from the first side of the housing to the second side of the housing at the second end of the housing;
   a yoke attached to the roller support pin, the yoke having a first end and a second end;
   a roller attached to the first end of the yoke;
   a first spring plate attached to the second end of the yoke and facing the second end of the housing;
   a second spring plate attached to the handle pin and facing the first spring plate;
   a compression spring disposed between the first spring plate and the second spring plate;
   a keeper assembly fastenable to the second panel, the keeper assembly comprising an upper surface and a lower surface;
   a keeper housing depending from the lower surface of the keeper assembly, the keeper housing defining a bore therethrough;

a keeper disposed within the bore of the keeper housing and protruding therefrom such that the keeper engages the roller when the pressure relief latch is in a closed position.

2. The pressure relief latch according to claim 1, further comprising a safety release attached to the handle, wherein when the safety release is engaged, upward rotation of the handle is prevented, and further wherein when the safety release is disengaged, upward rotation of the handle is allowed, the upward rotation of the handle causing the roller to move away from the keeper and the roller to disengage the keeper, allowing at least one of the panels to open.

3. The pressure relief latch according to claim 2, further comprising a locking pin extending from the first side of the housing to the second side of the housing between the roller support pin and the handle pin, wherein the safety release comprises a hook, and further wherein when the safety release is engaged the hook of the safety release engages the locking pin, preventing upward rotation of the handle.

4. The pressure relief latch according to claim 1, wherein the compression spring is a first compression spring, and further comprising a second compression spring attached to the first spring plate and the second spring plate and extending therebetween, the second compression spring having a diameter less than a diameter of the first compression spring such that the second compression spring is disposed within the first compression spring.

5. The pressure relief latch according to claim 1, wherein the structure being secured by the latch is subject to internal pressure, and further wherein when the pressure inside the structure reaches a predetermined level the roller is forced upward along the keeper until it disengages the keeper, thereby relieving pressure within the structure.

6. The pressure relief latch according to claim 5, further comprising an adjustment nut attached to the keeper, wherein rotation of the adjustment nut causes axial movement of the keeper within the keeper housing and sets the predetermined pressure.

7. The pressure relief latch according to claim 1, wherein the keeper comprises a notch for secure engagement of the roller.

8. A pressure relief latch for use with first and second aircraft panels enclosing an interior space of said aircraft susceptible to high pressure, the pressure relief latch comprising:
- a housing comprising a first end and a second end, the housing further comprising a first attachment plate comprising an upper surface and a lower surface and defining a plurality of openings therethrough for attaching the housing to the first aircraft panel;
- a cutout portion defined in the first attachment plate and extending from the upper surface to the lower surface thereof;
- first and second support tabs depending from the lower surface of the attachment plate at the first end of the housing, said first and second support tabs being spaced apart and defining a channel therebetween, said first support tab defining a first elongate aperture therethrough and said second support tab defining a second elongate aperture therethrough;
- first and second hinge plates depending from the lower surface of the attachment plate at the second end of the housing, said first and second hinge plates being spaced apart and defining a channel therebetween;
- first and second locking plates depending from the lower surface of the attachment plate between the first and second support tabs and the first and second hinge plates, the first and second locking plates being spaced apart and defining a channel therebetween;
- a pivot pin extending between the first hinge plate and the second hinge plate;
- a locking pin extending between the first locking plate and the second locking plate;
- a roller support pin extending from the first elongate aperture of the first support tab and the second elongate aperture of the second support tab;
- a handle disposed within the cutout portion of the first attachment plate, the handle pivotably attached to the pivot pin and comprising first and second spaced-apart hinge members depending therefrom, the first and second spaced-apart hinge members defining a channel therebetween, the first hinge member defining a third elongate aperture therethrough, and the second hinge member defining a fourth elongate aperture therethrough;
- a handle pin extending between the third aperture of the first hinge member and the fourth aperture of the second hinge member;
- a safety release pivotably attached to the handle and comprising an upper surface and a lower surface, the safety release further comprising first and second hooks depending from the lower surface thereof, wherein when said safety release is engaged, said first and second hooks engage the locking pin to prevent upward rotation of the handle;
- a yoke attached to the roller support pin, the yoke comprising roller disposed on a first side thereof;
- a first spring plate attached to the yoke on a second side thereof;
- a second spring plate attached to the handle pin;
- a spring support attached to the first spring plate and the second spring plate and extending therebetween;
- a first spring disposed along the length of the spring support between the first spring plate and the second spring plate;
- a second spring disposed along the length of the spring support between the first spring plate and the second spring plate, the second spring having a diameter greater than a diameter of the first spring such that the first spring is disposed within the second spring;
- a keeper assembly comprising a second attachment plate, the second attachment plate comprising an upper surface and a lower surface and defining a plurality of openings extending from the upper surface to the lower surface, the openings for receiving fasteners therethrough for attaching the keeper assembly to said second aircraft panel;
- a keeper housing depending from the lower surface of the second attachment plate, the keeper housing defining a bore extending therethrough;
- a keeper disposed within the bore of the keeper housing and extending from a first side of the keeper housing to engage the roller when the pressure relief latch is in a closed position,
- wherein when the pressure relief latch is in a closed position, the keeper engages the roller such that the latch retains said first and second panels in a closed position,
- and further wherein when the safety release is actuated, the first and second hooks disengage the locking pin, allowing upward rotation of the handle, the upward rotation of the handle causing the roller to disengage the keeper.

9. The pressure relief latch according to claim 8, wherein the interior space of the aircraft being secured by the latch is subject to internal pressure, and further wherein when the pressure inside the structure reaches a predetermined level the roller is forced upward along the keeper until it disengages the keeper, thereby relieving pressure within the interior space.

10. The pressure relief latch according to claim 9, further comprising an adjustment nut attached to the keeper, wherein rotation of the adjustment nut causes axial movement of the keeper within the keeper housing and sets the predetermined pressure.

11. The pressure relief latch according to claim 9, further comprising an adjustment nut attached to the second spring plate, wherein rotation of the adjustment nut in a first direction causes compression of the first and second spring, and rotation of the adjustment nut in a second direction causes expansion of the first and second spring, and wherein the directional rotation of the adjustment nut sets the predetermined pressure.

12. The pressure relief latch according to claim 8, further comprising a torsion spring biasing against the lower surface of the safety release.

13. The pressure relief latch according to claim 8, further comprising a clip engaging the handle pin and preventing side to side movement thereof.

\* \* \* \* \*